US012283279B2

(12) United States Patent
Batke et al.

(10) Patent No.: US 12,283,279 B2
(45) **Date of Patent: *Apr. 22, 2025**

(54) METHOD AND DEVICE FOR DECODING AN AUDIO SOUNDFIELD REPRESENTATION

(71) Applicant: Dolby Laboratories Licensing Corporation, San Francisco, CA (US)

(72) Inventors: Johann-Markus Batke, Hannover (DE); Florian Keiler, Hannover (DE); Johannes Boehm, Goettingen (DE)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,321

(22) Filed: Mar. 15, 2024

(65) Prior Publication Data

US 2024/0304195 A1 Sep. 12, 2024

Related U.S. Application Data

(60) Continuation of application No. 17/560,223, filed on Dec. 22, 2021, now Pat. No. 11,948,583, which is a (Continued)

(30) Foreign Application Priority Data

Mar. 26, 2010 (EP) .................................... 10305316

(51) Int. Cl.
*G10L 19/00* (2013.01)
*G10L 19/008* (2013.01)

(Continued)

(52) U.S. Cl.
CPC .............. *G10L 19/008* (2013.01); *H04S 3/02* (2013.01); *H04S 7/308* (2013.01); *H04S 2400/13* (2013.01); *H04S 2420/11* (2013.01)

(58) Field of Classification Search
USPC .............................................. 381/17, 20, 22
See application file for complete search history.

(56) References Cited

U.S. PATENT DOCUMENTS

| | | | | |
|---|---|---|---|---|
| 5,594,800 A * | 1/1997 | Gerzon | H04S 3/02 | 381/20 |
| 7,558,393 B2 * | 7/2009 | Miller, III | H04S 3/002 | 381/20 |

(Continued)

FOREIGN PATENT DOCUMENTS

| | | |
|---|---|---|
| EP | 1275272 | 1/2003 |
| EP | 1737267 | 12/2006 |

(Continued)

OTHER PUBLICATIONS

Batke, Johann-Markus, et al., "Investigation of Robust Panning Functions for 3D Loudspeaker Setups", presented at the 128th Conference on Audio Eng. Soc. London, UK, May 22-25, 2010, pp. 1-9.

(Continued)

*Primary Examiner* — Ishrat I Sherali

(57) ABSTRACT

Soundfield signals such as e.g. Ambisonics carry a representation of a desired sound field. The Ambisonics format is based on spherical harmonic decomposition of the soundfield, and Higher Order Ambisonics (HOA) uses spherical harmonics of at least $2^{nd}$ order. However, commonly used loudspeaker setups are irregular and lead to problems in decoder design. A method for improved decoding an audio soundfield representation for audio playback comprises calculating a panning function (W) using a geometrical method based on the positions of a plurality of loudspeakers and a plurality of source directions, calculating a mode matrix ($\Xi$) from the loudspeaker positions, calculating a pseudo-inverse mode matrix ($\Xi^+$) and decoding the audio soundfield representation. The decoding is based on a decode matrix (D) that (Continued)

is obtained from the panning function (W) and the pseudo-inverse mode matrix ($\Xi^+$).

4 Claims, 6 Drawing Sheets

Related U.S. Application Data division of application No. 16/852,459, filed on Apr. 18, 2020, now Pat. No. 11,217,258, which is a division of application No. 16/189,768, filed on Nov. 13, 2018, now Pat. No. 10,629,211, which is a division of application No. 16/019,233, filed on Jun. 26, 2018, now Pat. No. 10,134,405, which is a division of application No. 15/681,793, filed on Aug. 21, 2017, now Pat. No. 10,037,762, which is a continuation of application No. 15/245,061, filed on Aug. 23, 2016, now Pat. No. 9,767,813, which is a continuation of application No. 14/750,115, filed on Jun. 25, 2015, now Pat. No. 9,460,726, which is a continuation of application No. 13/634,859, filed as application No. PCT/EP2011/054644 on Mar. 25, 2011, now Pat. No. 9,100,768.

(51) Int. Cl.
*H04S 3/02* (2006.01)
*H04S 7/00* (2006.01)

(56) References Cited

U.S. PATENT DOCUMENTS

| | | | | |
|---|---|---|---|---|
| 8,290,167 | B2 * | 10/2012 | Pulkki | H04S 3/02 381/23 |
| 8,712,061 | B2 * | 4/2014 | Jot | G10L 19/008 381/23 |
| 9,100,768 | B2 * | 8/2015 | Batke | H04S 3/02 |
| 10,134,405 | B2 * | 11/2018 | Batke | H04S 7/308 |
| 10,244,339 | B2 | 3/2019 | Kropp | |
| 10,629,211 | B2 | 4/2020 | Batke | |
| 11,217,258 | B2 | 1/2022 | Batke | |
| 11,948,583 | B2 * | 4/2024 | Batke | H04S 7/308 |

FOREIGN PATENT DOCUMENTS

| | | | |
|---|---|---|---|
| EP | 2094032 | A1 | 8/2009 |
| EP | 2460118 | | 6/2012 |
| EP | 2879408 | A1 | 6/2015 |
| JP | H52-134701 | | 11/1977 |
| JP | 2003-531555 | | 10/2003 |
| JP | 2008-017117 | | 1/2008 |
| JP | 2009-218655 | | 9/2009 |
| JP | 2018-088655 | | 6/2018 |
| WO | 2004/049299 | | 6/2004 |
| WO | 2008/043549 | | 4/2008 |
| WO | 2008/113427 | | 9/2008 |
| WO | 2008/113428 | | 9/2008 |
| WO | 2010/017978 | | 2/2010 |

OTHER PUBLICATIONS

Hamasaki, K. et al "Wide listening area with exceptional spatial sound quality of a 22.2 multichannel sound system", Audio Engineering Society Preprints, Vienna, Austria, May 5-8, 2007, Paper 7037 presented at the 122nd Convention, pp. 1-22.

Holman Tomlinson "Sound for Film and Television", 3rd Edition, Feb. 28, 2010, ISBN 978-0-240-81330-1, 1 page advertisement about publication.

Keiler, F. et al. "Evaluation of Virtual Source Localisation using 3D Loudspeaker Setups", 128th Convention of the Audio Eng. Soc., London, UK, May 22-25, 2010, pp. 1-7.

Lee, Seung-Rae et al. "Generalized Encoding and Decoding Functions for a Cylindrical Ambisonic Sound System", IEEE Signal Processing Letters, vol. 10, No. 1, Jan. 2003, pp. 21-24.

MDG—Musikproduktion Dabringhaus und Grimm, www.mdg.de, publication date approximately Feb. 2001, 2 pages. English Translation.

Mdg-Musikproduktion Dabringhaus und Grimm, www.mdg.de, retrieved from the Internet Nov. 7, 2011, pp. 1-3.

Neukom, Martin "Decoding Second Order Ambisonics to 5.1 Surround Systems", AES Convention 121, Oct. 5-8, 2006, San Francisco.

Poletti, M.A. "Three-Dimensional Surround Sound Systems Based on Spherical Harmonics", J. Audio Eng. Soc., vol. 53 (11), pp. 1004-1025, Nov. 2005.

Poletti, Mark "Robust Two-dimensional Surround Sound Reproduction for Nonuniform Loudspeaker Layouts", J. Audio Eng. Soc. vol. 55, No. 7/8, Jul./Aug. 2007, pp. 598-610.

Pomberger, H. et al. "An Ambisonics Format for Flexible Playback Layouts", Proceedings of the 1st Ambisonics Symposium, Graz, Austria, Jun. 25-27, 2009, pp. 1-8.

Pulkki, Ville "Directional Audio Coding in Spatial Sound Reproduction and Stereo Upmixing", Internet Citation, Jun. 30, 2006, pp. 1-8.

Pulkki, Ville "Virtual Sound Source Positioning Using Vector Base Amplitude Panning", Journal of the audio Engineering Society, New York, vol. 45, No. 6, Jun. 1997.

Pulkki, Ville, "Spatial Sound Generation and Perception by Amplitude Panning Techniques", Ph.D. dissertation, Helsinki University of Technology 2001, (Online) http://libtkk.ft/Diss/2001/isbn951225324/.

Seung-Rae Lee et al, "Generalized Encoding and Decoding Functions for a Cylindrical Ambisonic Sound System", IEEE Signal Processing Letters, IEEE Service Center, Piscataway/NJ, US, vol. 10, No. 1.

Williams Earl G. "Fourier Accoustics", Acedemic Press, Jun. 10, 1999, Abstract ISBN 978-0127539607, (Book).

* cited by examiner

METHOD AND DEVICE FOR DECODING AN AUDIO SOUNDFIELD REPRESENTATION

CROSS-REFERENCE TO RELATED APPLICATION

This application is a continuation of U.S. patent application Ser. No. 17/560,223, filed Dec. 22, 2021, which is a division of U.S. patent application Ser. No. 16/852,459, filed Apr. 18, 2020, now U.S. Pat. No. 11,217,258, which is a division of U.S. patent application Ser. No. 16/189,768, filed Nov. 13, 2018, now U.S. Pat. No. 10,629,211, which is a division of U.S. patent application Ser. No. 16/019,233, filed Jun. 26, 2018, now U.S. Pat. No. 10,134,405, which is division of U.S. patent application Ser. No. 15/681,793, filed Aug. 21, 2017, now U.S. Pat. No. 10,037,762, which is continuation of U.S. patent application Ser. No. 15/245,061, filed Aug. 23, 2016, now U.S. Pat. No. 9,767,813, which is continuation of U.S. patent application Ser. No. 14/750,115, filed Jun. 25, 2015, now U.S. Pat. No. 9,460,726, which is continuation of U.S. patent application Ser. No. 13/634,859, filed Sep. 13, 2012, now U.S. Pat. No. 9,100,768, which is national stage application of International Application No. PCT/EP2011/054644, filed Mar. 25, 2011, which claims priority to European Patent Application No. 10305316.1, filed Mar. 26, 2010, each of which is hereby incorporated by reference in its entirety.

FIELD OF THE INVENTION

This invention relates to a method and a device for decoding an audio soundfield representation, and in particular an Ambisonics formatted audio representation, for audio playback.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art, unless a source is expressly mentioned.

Accurate localisation is a key goal for any spatial audio reproduction system. Such reproduction systems are highly applicable for conference systems, games, or other virtual environments that benefit from 3D sound. Sound scenes in 3D can be synthesised or captured as a natural sound field. Soundfield signals such as e.g. Ambisonics carry a representation of a desired sound field. The Ambisonics format is based on spherical harmonic decomposition of the soundfield. While the basic Ambisonics format or B-format uses spherical harmonics of order zero and one, the so-called Higher Order Ambisonics (HOA) uses also further spherical harmonics of at least $2^{nd}$ order. A decoding process is required to obtain the individual loudspeaker signals. To synthesise audio scenes, panning functions that refer to the spatial loudspeaker arrangement, are required to obtain a spatial localisation of the given sound source. If a natural sound field should be recorded, microphone arrays are required to capture the spatial information. The known Ambisonics approach is a very suitable tool to accomplish it. Ambisonics formatted signals carry a representation of the desired sound field. A decoding process is required to obtain the individual loudspeaker signals from such Ambisonics formatted signals. Since also in this case panning functions can be derived from the decoding functions, the panning functions are the key issue to describe the task of spatial localisation. The spatial arrangement of loudspeakers is referred to as loudspeaker setup herein.

Commonly used loudspeaker setups are the stereo setup, which employs two loudspeakers, the standard surround setup using five loudspeakers, and extensions of the surround setup using more than five loudspeakers. These setups are well known. However, they are restricted to two dimensions (2D), e.g. no height information is reproduced.

Loudspeaker setups for three dimensional (3D) playback are described for example in "Wide listening area with exceptional spatial sound quality of a 22.2 multichannel sound system", K. Hamasaki, T. Nishiguchi, R. Okumaura, and Y. Nakayama in Audio Engineering Society Preprints, Vienna, Austria, May 2007, which is a proposal for the NHK ultra high definition TV with 22.2 format, or the 2+2+2 arrangement of Dabringhaus (mdg-musikproduktion dabringhaus und grimm, www.mdq.de) and a 10.2 setup in "Sound for Film and Television", T. Holman in 2nd ed. Boston: Focal Press, 2002. One of the few known systems referring to spatial playback and panning strategies is the vector base amplitude panning (VBAP) approach in "Virtual sound source positioning using vector base amplitude panning," Journal of Audio Engineering Society, vol. 45, no. 6, pp. 456-466, June 1997, herein Pulkki. VBAP (Vector Base Amplitude Panning) has been used by Pulkki to play back virtual acoustic sources with an arbitrary loudspeaker setup. To place a virtual source in a 2D plane, a pair of loudspeakers is required, while in a 3D case loudspeaker triplets are required. For each virtual source, a monophonic signal with different gains (dependent on the position of the virtual source) is fed to the selected loudspeakers from the full setup. The loudspeaker signals for all virtual sources are then summed up. VBAP applies a geometric approach to calculate the gains of the loudspeaker signals for the panning between the loudspeakers.

An exemplary 3D loudspeaker setup example considered and newly proposed herein has 16 loudspeakers, which are positioned as shown in FIG. 2. The positioning was chosen due to practical considerations, having four columns with three loudspeakers each and additional loudspeakers between these columns. In more detail, eight of the loudspeakers are equally distributed on a circle around the listener's head, enclosing angles of 45 degrees. Additional four speakers are located at the top and the bottom, enclosing azimuth angles of 90 degrees. With regard to Ambisonics, this setup is irregular and leads to problems in decoder design, as mentioned in "An ambisonics format for flexible playback layouts," by H. Pomberger and F. Zotter in Proceedings of the $1^{st}$ Ambisonics Symposium, Graz, Austria, July 2009.

Conventional Ambisonics decoding, as described in "Three-dimensional surround sound systems based on spherical harmonics" by M. Poletti in J. Audio Eng. Soc., vol. 53, no. 11, pp. 1004-1025, November 2005, employs the commonly known mode matching process. The modes are described by mode vectors that contain values of the spherical harmonics for a distinct direction of incidence. The combination of all directions given by the individual loudspeakers leads to the mode matrix of the loudspeaker setup, so that the mode matrix represents the loudspeaker positions. To reproduce the mode of a distinct source signal, the loudspeakers' modes are weighted in that way that the superimposed modes of the individual loudspeakers sum up to the desired mode. To obtain the necessary weights, an inverse matrix representation of the loudspeaker mode matrix needs to be calculated. In terms of signal decoding, the weights form the driving signal of the loudspeakers, and the inverse loudspeaker mode matrix is referred to as "decoding matrix", which is applied for decoding an Ambisonics formatted signal representation. In particular, for many loudspeaker setups, e.g. the setup shown in FIG. 2, it is difficult to obtain the inverse of the mode matrix.

As mentioned above, commonly used loudspeaker setups are restricted to 2D, i.e. no height information is reproduced. Decoding a soundfield representation to a loudspeaker setup with mathematically non-regular spatial distribution leads to localization and coloration problems with the commonly known techniques. For decoding an Ambisonics signal, a decoding matrix (i.e. a matrix of decoding coefficients) is used. In conventional decoding of Ambisonics signals, and particularly HOA signals, at least two problems occur. First, for correct decoding it is necessary to know signal source directions for obtaining the decoding matrix. Second, the mapping to an existing loudspeaker setup is systematically wrong due to the following mathematical problem: a mathematically correct decoding will result in not only positive, but also some negative loudspeaker amplitudes. However, these are wrongly reproduced as positive signals, thus leading to the above-mentioned problems.

SUMMARY OF THE INVENTION

The present invention describes a method for decoding a soundfield representation for non-regular spatial distributions with highly improved localization and coloration properties. It represents another way to obtain the decoding matrix for soundfield data, e.g. in Ambisonics format, and it employs a process in a system estimation manner. Considering a set of possible directions of incidence, the panning functions related to the desired loudspeakers are calculated. The panning functions are taken as output of an Ambisonics decoding process. The required input signal is the mode matrix of all considered directions. Therefore, as shown below, the decoding matrix is obtained by right multiplying the weighting matrix by an inverse version of the mode matrix of input signals.

Concerning the second problem mentioned above, it has been found that it is also possible to obtain the decoding matrix from the inverse of the so-called mode matrix, which represents the loudspeaker positions, and position-dependent weighting functions ("panning functions") W. One aspect of the invention is that these panning functions W can be derived using a different method than commonly used. Advantageously, a simple geometrical method is used. Such method requires no knowledge of any signal source direction, thus solving the first problem mentioned above. One such method is known as "Vector-Based Amplitude Panning" (VBAP). According to the invention, VBAP is used to calculate the required panning functions, which are then used to calculate the Ambisonics decoding matrix. Another problem occurs in that the inverse of the mode matrix (that represents the loudspeaker setup) is required. However, the exact inverse is difficult to obtain, which also leads to wrong audio reproduction. Thus, an additional aspect is that for obtaining the decoding matrix a pseudo-inverse mode matrix is calculated, which is much easier to obtain.

The invention uses a two-step approach. The first step is a derivation of panning functions that are dependent on the loudspeaker setup used for playback. In the second step, an Ambisonics decoding matrix is computed from these panning functions for all loudspeakers.

An advantage of the invention is that no parametric description of the sound sources is required; instead, a soundfield description such as Ambisonics can be used.

According to the invention, a method for decoding an audio soundfield representation for audio playback comprises steps of steps of calculating, for each of a plurality of loudspeakers, a panning function using a geometrical method based on the positions of the loudspeakers and a plurality of source directions, calculating a mode matrix from the source directions, calculating a pseudo-inverse mode matrix of the mode matrix, and decoding the audio soundfield representation, wherein the decoding is based on a decode matrix that is obtained from at least the panning function and the pseudo-inverse mode matrix.

According to another aspect, a device for decoding an audio soundfield representation for audio playback comprises first calculating means for calculating, for each of a plurality of loudspeakers, a panning function using a geometrical method based on the positions of the loudspeakers and a plurality of source directions, second calculating means for calculating a mode matrix from the source directions, third calculating means for calculating a pseudo-inverse mode matrix of the mode matrix, and decoder means for decoding the soundfield representation, wherein the decoding is based on a decode matrix and the decoder means uses at least the panning function and the pseudo-inverse mode matrix to obtain the decode matrix. The first, second and third calculating means can be a single processor or two or more separate processors.

According to yet another aspect, a computer readable medium has stored on it executable instructions to cause a computer to perform a method for decoding an audio soundfield representation for audio playback comprises steps of calculating, for each of a plurality of loudspeakers, a panning function using a geometrical method based on the positions of the loudspeakers and a plurality of source directions, calculating a mode matrix from the source directions, calculating pseudo-inverse of the mode matrix, and decoding the audio soundfield representation, wherein the decoding is based on a decode matrix that is obtained from at least the panning function and the pseudo-inverse mode matrix.

According to another aspect, there is a method for decoding an ambisonics audio soundfield representation for playback over a plurality of loudspeakers, the method including receiving a first matrix that includes gain vectors that are based on a panning based on positions of the loudspeakers and a plurality of source directions. The source directions may be distributed evenly over a unit sphere, a number of the source directions is S, the order of the ambisonics audio soundfield representation is N, and $S \geq (N+1)^2$. The method further including receiving a mode matrix determined based on the source directions and an order of the ambisonics audio soundfield representation. The method further including receiving a base matrix determined based on the mode matrix and the first matrix, and decoding the ambisonics audio soundfield representation with a decoding matrix, wherein the decoding matrix is based on the first matrix and the base matrix. The geometrical method used in the step of obtaining the panning may be based on Vector Base Amplitude Panning (VBAP). The ambisonics soundfield representation may be of at least a 2nd order.

According to another aspect, there is a device for decoding an ambisonics audio soundfield representation for playback over a plurality of loudspeakers. The device may include a means for receiving a first matrix that includes gain vectors that are based on a panning based on positions of the loudspeakers and a plurality of source directions. The source directions may be distributed evenly over a unit sphere, a number of the source directions is S, the order of the ambisonics audio soundfield representation is N, and $S \geq (N+1)^2$. The device may further include a means for receiving a mode matrix determined based on the source directions and an order of the ambisonics audio soundfield representation. The device may further include a means for receiving a base matrix determined based on the mode matrix. It may also include a means for decoding the ambisonics audio soundfield representation with a decoding matrix. The decoding matrix is based on the first matrix and the base matrix. The panning may be obtained based on a Vector Base Amplitude Panning (VBAP). The ambisonics soundfield representation may be of at least a 2nd order.

In one example, a nontransitory computer readable medium may have stored on it executable instructions to cause a computer to perform a method for decoding an ambisonics audio soundfield representation for audio playback. The method may include receiving a first matrix that includes gain vectors that are a panning based on positions of the loudspeakers and a plurality of source directions. The source directions may be distributed evenly over a unit sphere, a number of the source directions is S, the order of the ambisonics audio soundfield representation may be N, and $S \geq (N+1)^2$. The method may include receiving a mode matrix determined based on the source directions and an order of the ambisonics audio soundfield representation. It may further include receiving a base matrix determined based on the mode matrix and the first matrix. The method may further include decoding the ambisonics audio soundfield representation with a decoding matrix wherein the decoding matrix is based on the first matrix and the base matrix, the source directions are distributed evenly over a unit sphere.

Advantageous embodiments of the invention are disclosed in the dependent claims, the following description and the figures.

BRIEF DESCRIPTION OF THE DRAWINGS

Exemplary embodiments of the invention are described with reference to the accompanying drawings.

DETAILED DESCRIPTION OF THE INVENTION

Figure 1:
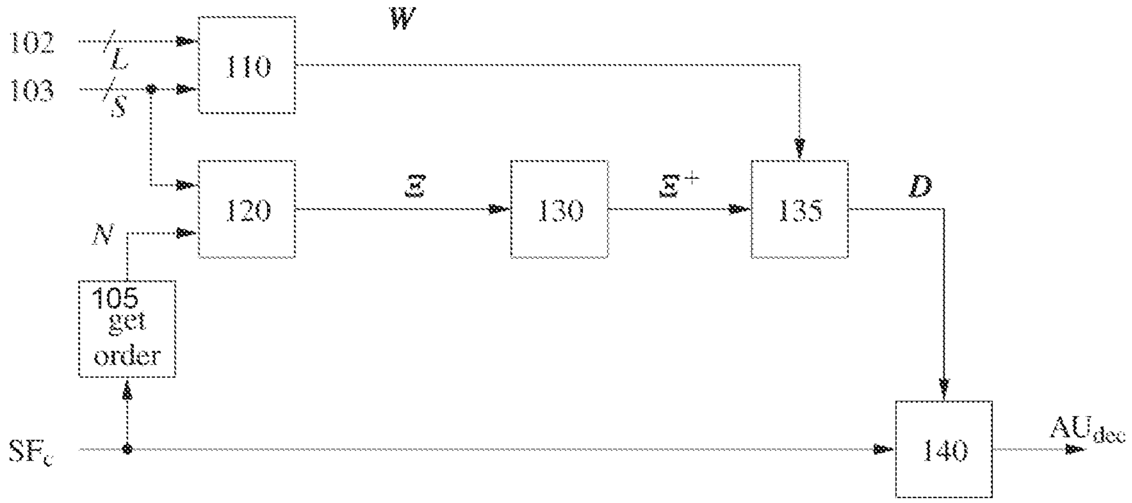
FIG. 1 illustrates a flow-chart of the method.

As shown in FIG. 1, a method for decoding an audio soundfield representation $SF_c$ for audio playback comprises steps of calculating 110, for each of a plurality of loudspeakers, a panning function W using a geometrical method based on the positions 102 of the loudspeakers (L is the number of loudspeakers) and a plurality of source directions 103 (S is the number of source directions), calculating 120 a mode matrix $\Xi$ from the source directions and a given order N of the soundfield representation, calculating 130 a pseudo-inverse mode matrix $\Xi^+$ of the mode matrix $\Xi$, and decoding 135, 140 the audio soundfield representation $SF_c$. wherein decoded sound data $AU_{dec}$ are obtained. The decoding is based on a decode matrix D that is obtained 135 from at least the panning function W and the pseudo-inverse mode matrix $\Xi^+$. In one embodiment, the pseudo-inverse mode matrix is obtained according to $\Xi^+=\Xi^H[\Xi\Xi^H]^{-1}$ The order N of the soundfield representation may be pre-defined, or it may be extracted 105 from the input signal $SF_c$.

Figure 7:
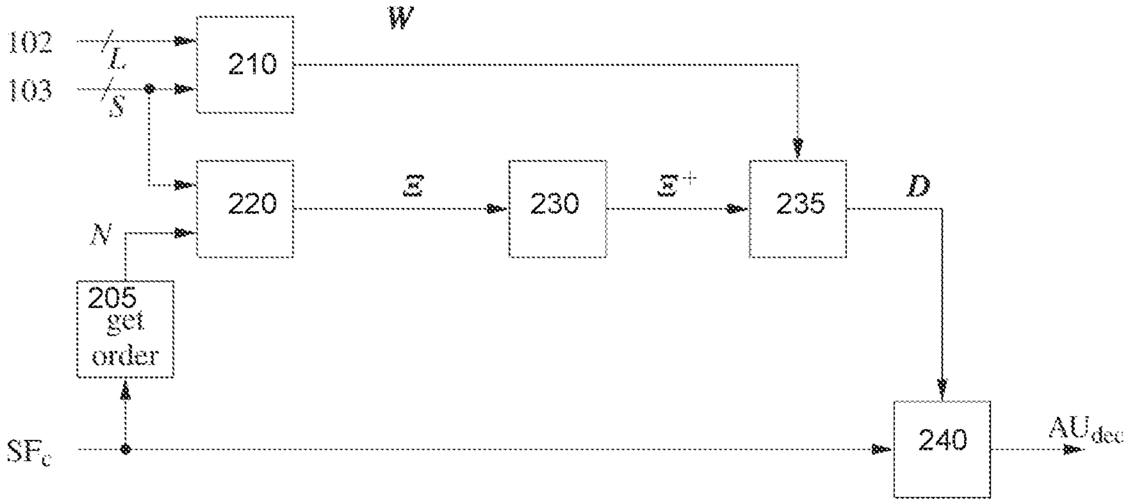
FIG. 7 illustrates a block diagram of a device.

As shown in FIG. 7, a device for decoding an audio soundfield representation for audio playback comprises first calculating means 210 for calculating, for each of a plurality of loudspeakers, a panning function W using a geometrical method based on the positions 102 of the loudspeakers and a plurality of source directions 103, second calculating means 220 for calculating a mode matrix $\Xi$ from the source directions, third calculating means 230 for calculating a pseudo-inverse mode matrix $\Xi^+$ of the mode matrix $\Xi$, and decoder means 240 for decoding the soundfield representation. The decoding is based on a decode matrix D, which is obtained from at least the panning function W and the pseudo-inverse mode matrix $\Xi^+$ by a decode matrix calculating means 235 (e.g. a multiplier). The decoder means 240 uses the decode matrix D to obtain a decoded audio signal $AU_{dec}$. The first, second and third calculating means 220, 230, 240 can be a single processor, or two or more separate processors. The order N of the soundfield representation may be pre-defined, or it may be obtained by a means 205 for extracting the order from the input signal $SF_c$.

Figure 2:
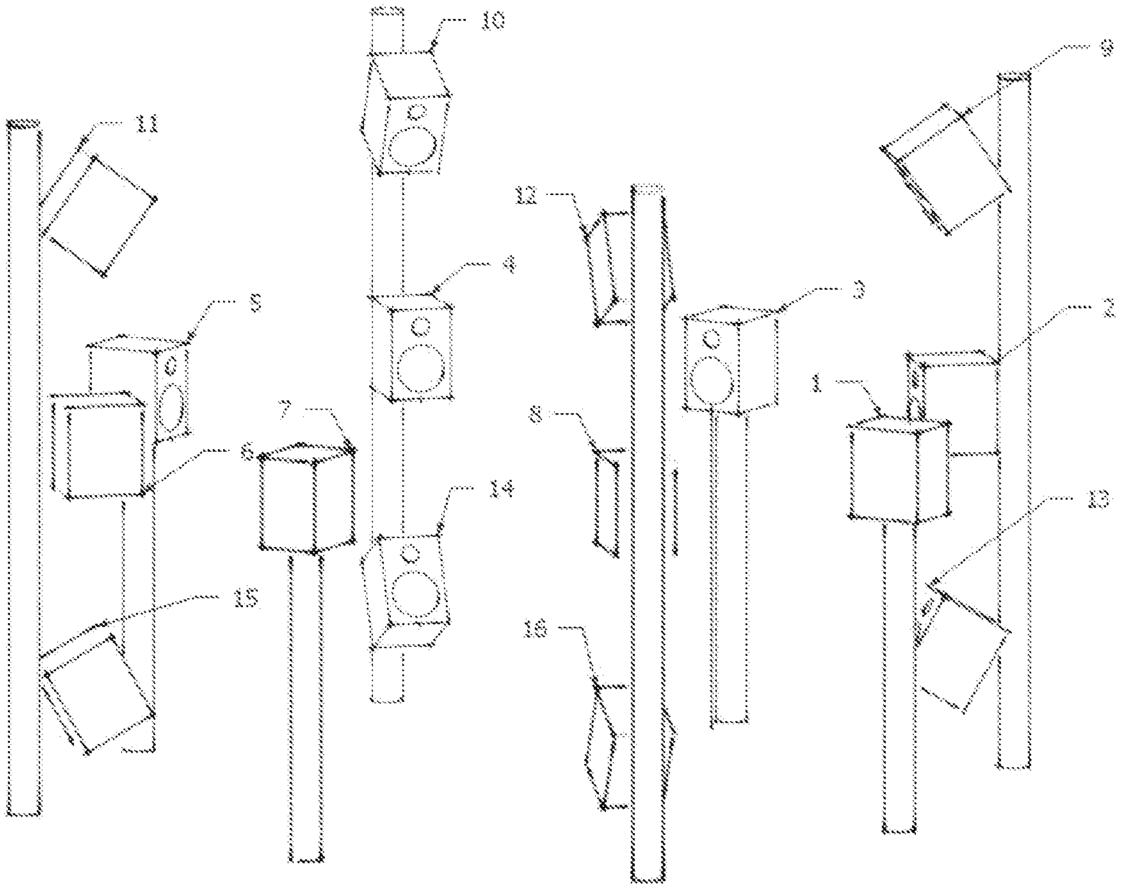
FIG. 2 illustrates an exemplary 3D setup with 16 loudspeakers.

A particularly useful 3D loudspeaker setup has 16 loudspeakers. As shown in FIG. 2, there are four columns with three loudspeakers each, and additional loudspeakers between these columns. Eight of the loudspeakers are equally distributed on a circle around the listener's head, enclosing angles of 45 degrees. Additional four speakers are located at the top and the bottom, enclosing azimuth angles of 90 degrees. With regard to Ambisonics, this setup is irregular and usually leads to problems in decoder design.

In the following, Vector Base Amplitude Panning (VBAP) is described in detail. In one embodiment, VBAP is used herein to place virtual acoustic sources with an arbitrary loudspeaker setup where the same distance of the loudspeakers from the listening position is assumed. VBAP uses three loudspeakers to place a virtual source in the 3D space. For each virtual source, a monophonic signal with different gains is fed to the loudspeakers to be used. The gains for the different loudspeakers are dependent on the position of the virtual source. VBAP is a geometric approach to calculate the gains of the loudspeaker signals for the panning between the loudspeakers. In the 3D case, three loudspeakers arranged in a triangle build a vector base. Each vector base is identified by the loudspeaker numbers k,m,n and the loudspeaker position vectors $I_k$, $I_m$, $I_n$ given in Cartesian coordinates normalised to unity length. The vector base for loudspeakers k,m,n is defined by $$L_{kmn} = \{I_k, I_m, I_n\} \tag{1}$$

The desired direction $\Omega=(\theta, \phi)$ of the virtual source has to be given as azimuth angle $\phi$ and inclination angle $\theta$. The unity length position vector p(Q) of the virtual source in Cartesian coordinates is therefore defined by $$p(\Omega) = \{\cos\phi\sin\theta, \sin\phi\sin\theta, \cos\theta\}^T \quad (2)$$

A virtual source position can be represented with the vector base and the gain factors $g(\Omega)=(\tilde{g}_k, \tilde{g}_m, \tilde{g}_n)^T$ by $$p(\Omega) = L_{kmn}\, g(\Omega) = \tilde{g}_k\, l_k + \tilde{g}_m\, l_m + \tilde{g}_n\, l_n \quad (3)$$

By inverting the vector base matrix the required gain factors can be computed by $$g(\Omega) = L_{kmn}^{-1}\, p(\Omega) \quad (4)$$

The vector base to be used is determined according to Pulkki's document: First the gains are calculated according to Pulkki for all vector bases. Then for each vector base the minimum over the gain factors is evaluated by ~gmin=min{~gk, ~gm, ~gn}. Finally the vector base where ~gmin has the highest value is used. The resulting gain factors must not be negative. Depending on the listening room acoustics the gain factors may be normalised for energy preservation.

In the following, the Ambisonics format is described, which is an exemplary soundfield format. The Ambisonics representation is a sound field description method employing a mathematical approximation of the sound field in one location. Using the spherical coordinate system, the pressure at point $r=(r,\theta, \phi)$ in space is described by means of the spherical Fourier transform $$p(r, k) = \sum_{n=0}^{\infty}\sum_{m=-n}^{n} A_n^m(k) j_n(kr) Y_n^m(\theta, \phi) \quad (5)$$

where k is the wave number. Normally n runs to a finite order M. The coefficients $A^m{}_n(k)$ of the series describe the sound field (assuming sources outside the region of validity), $j_n(kr)$ is the spherical Bessel function of first kind and $Y^m{}_n$ $(\theta, \phi)$ denote the spherical harmonics. Coefficients $A^m{}_n$ (k) are regarded as Ambisonics coefficients in this context. The spherical harmonics $Y_{m\ n}$ $(\theta,\phi)$ only depend on the inclination and azimuth angles and describe a function on the unity sphere.

For reasons of simplicity often plain waves are assumed for sound field reproduction. The Ambisonics coefficients describing a plane wave as an acoustic source from direction $\Omega_s$ are $$A_{n,plane}^m(\Omega_s) = 4\pi i^n Y_n^m(\Omega_s)^* \quad (6)$$

Their dependency on wave number k decreases to a pure directional dependency in this special case. For a limited order M the coefficients form a vector A that may be arranged as $$A(\Omega_s) = [A_0^0\ A_1^{-1}\ A_1^0\ A_1^1\ \ldots\ A_M^M]^T \quad (7)$$

holding $O=(M+1)^2$ elements. The same arrangement is used for the spherical harmonics coefficients yielding a vector $Y(\Omega s)^*=[Y_0{}^0\ Y_1{}^{-1}\ Y_1{}^0\ Y_1{}^1 \ldots A_M{}^M]^H$.

Superscript H denotes the complex conjugate transpose.

To calculate loudspeaker signals from an Ambisonics representation of a sound field, mode matching is a commonly used approach. The basic idea is to express a given Ambisonics sound field description $A(\Omega_s)$ by a weighted sum of the loudspeakers' sound field descriptions $A(\Omega_l)$ $$A(\Omega_s) = \sum_{l=1}^{L} w_l A(\Omega_l) \quad (8)$$

where $\Omega_l$ denote the loudspeakers' directions, $w_l$ are weights, and L is the number of loudspeakers. To derive panning functions from eq.(8), we assume a known direction of incidence $\Omega_s$. If source and speaker sound fields are both plane waves, the factor $4\pi i^n$ (see eq.(6)) can be dropped and eq.(8) only depends on the complex conjugates of spherical harmonic vectors, also referred to as "modes". Using matrix notation, this is written as $$Y(\Omega_s)^* = \Psi w(\Omega_s) \quad (9)$$

where $\Psi$ is the mode matrix of the loudspeaker setup $$\Psi = [Y(\Omega_1)^*, Y(\Omega_2)^*, \ldots, Y(\Omega_L)^*] \quad (10)$$

with O× L elements. To obtain the desired weighting vector w, various strategies to accomplish this are known. If M=3 is chosen, $\Psi$ is square and may be invertible. Due to the irregular loudspeaker setup the matrix is badly scaled, though. In such a case, often the pseudo inverse matrix is chosen and $$D = [\Psi^H\Psi]^{-1}\Psi^H \quad (11)$$

yields a L×O decoding matrix D. Finally we can write $$w(\Omega_s) = DY(\Omega_s)^* \quad (12)$$

where the weights $w(\Omega_s)$ are the minimum energy solution for eq.(9). The consequences from using the pseudo inverse are described below.

The following describes the link between panning functions and the Ambisonics decoding matrix. Starting with Ambisonics, the panning functions for the individual loudspeakers can be calculated using eq.(12). Let $$\Xi = [Y(\Omega_1)^*, Y(\Omega_2)^*, \ldots, Y(\Omega_s)^*] \quad (13)$$

be the mode matrix of S input signal directions ($\Omega_s$), e. g. a spherical grid with an inclination angle running in steps of one degree from 1 . . . 180° and an azimuth angle from 1 . . . 360° respectively. This mode matrix has O×S elements. Using eq.(12), the resulting matrix W has L×S elements, row l holds the S panning weights for the respective loudspeaker:

$$W = D\Xi \tag{14}$$

Figure 3:
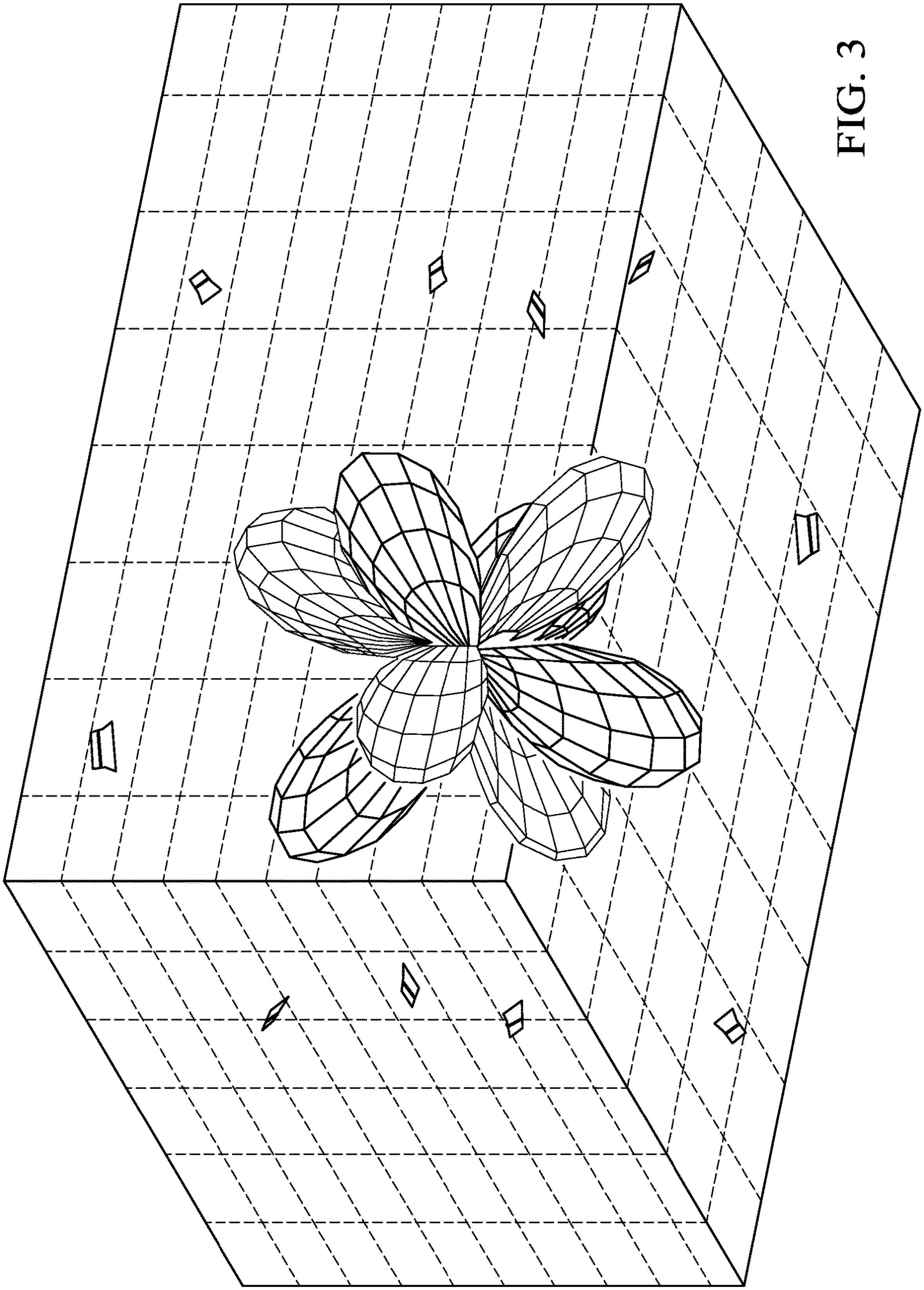
FIG. 3 illustrates a beam pattern resulting from decoding using non-regularized mode matching.
Figure 4:
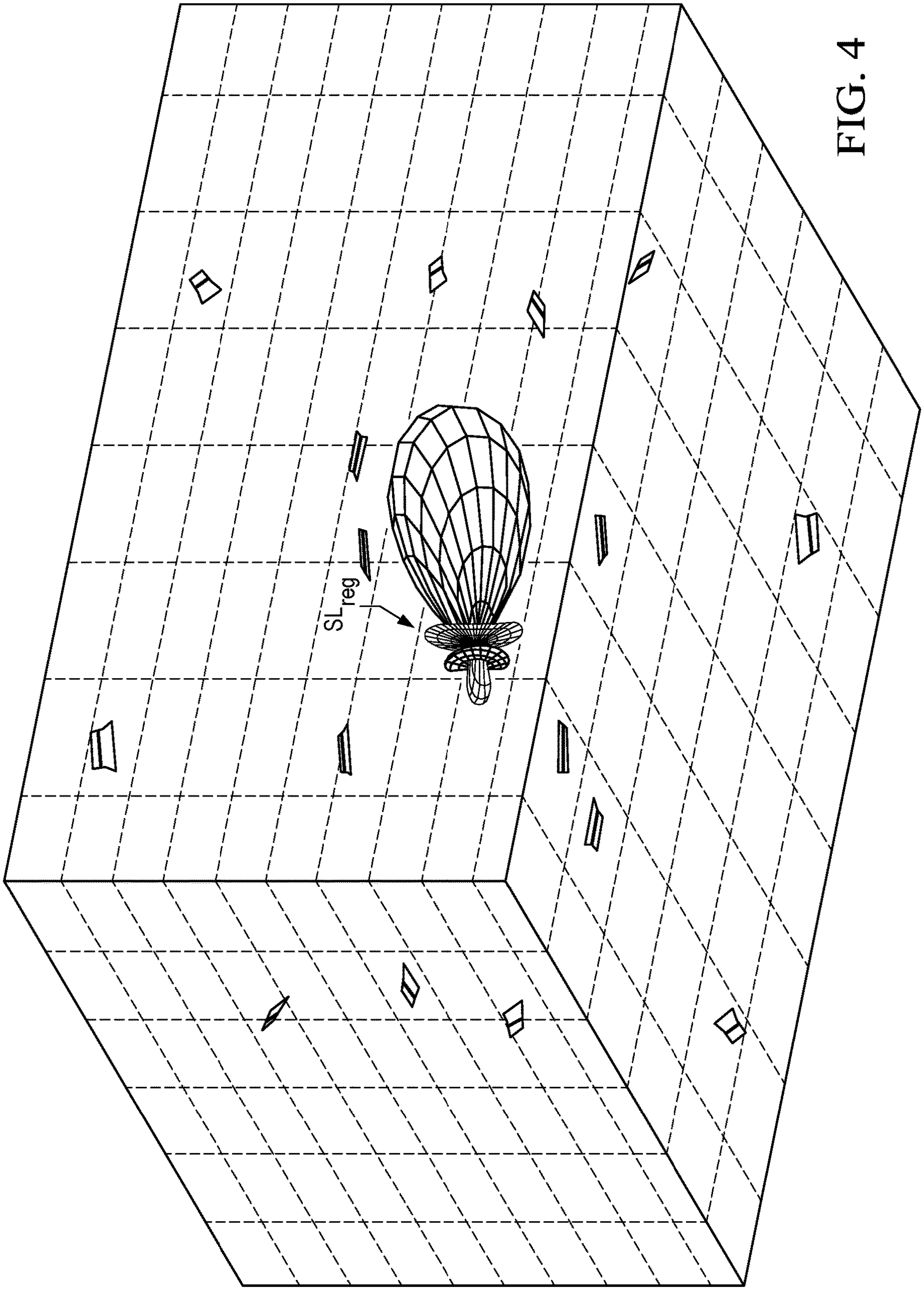
FIG. 4 illustrates a beam pattern resulting from decoding using a regularized mode matrix.

As a representative example, the panning function of a single loudspeaker 2 is shown as beam pattern in FIG. 3. The decode matrix D of the order M=3 in this example. As can be seen, the panning function values do not refer to the physical positioning of the loudspeaker at all. This is due to the mathematical irregular positioning of the loudspeakers, which is not sufficient as a spatial sampling scheme for the chosen order. The decode matrix is therefore referred to as a non-regularized mode matrix. This problem can be overcome by regularisation of the loudspeaker mode matrix Ψ in eq.(11). This solution works at the expense of spatial resolution of the decoding matrix, which in turn may be expressed as a lower Ambisonics order. FIG. 4 shows an exemplary beam pattern resulting from decoding using a regularized mode matrix, and particularly using the mean of eigenvalues of the mode matrix for regularization. Compared with FIG. 3, the direction of the addressed loudspeaker is now clearly recognised.

As outlined in the introduction, another way to obtain a decoding matrix D for playback of Ambisonics signals is possible when the panning functions are already known. The panning functions W are viewed as desired signal defined on a set of virtual source directions Ω, and the mode matrix Ξ of these directions serves as input signal. Then the decoding matrix can be calculated using $$D = W\Xi^H[\Xi\Xi^H]^{-1} = W\Xi^+ \tag{15}$$

where $\Xi^H[\Xi\Xi^H]^{-1}$ or simply $\Xi^+$ is the pseudo inverse of the mode matrix Ξ. In the new approach, we take the panning functions in W from VBAP and calculate an Ambisonics decoding matrix from this.

Figure 5:
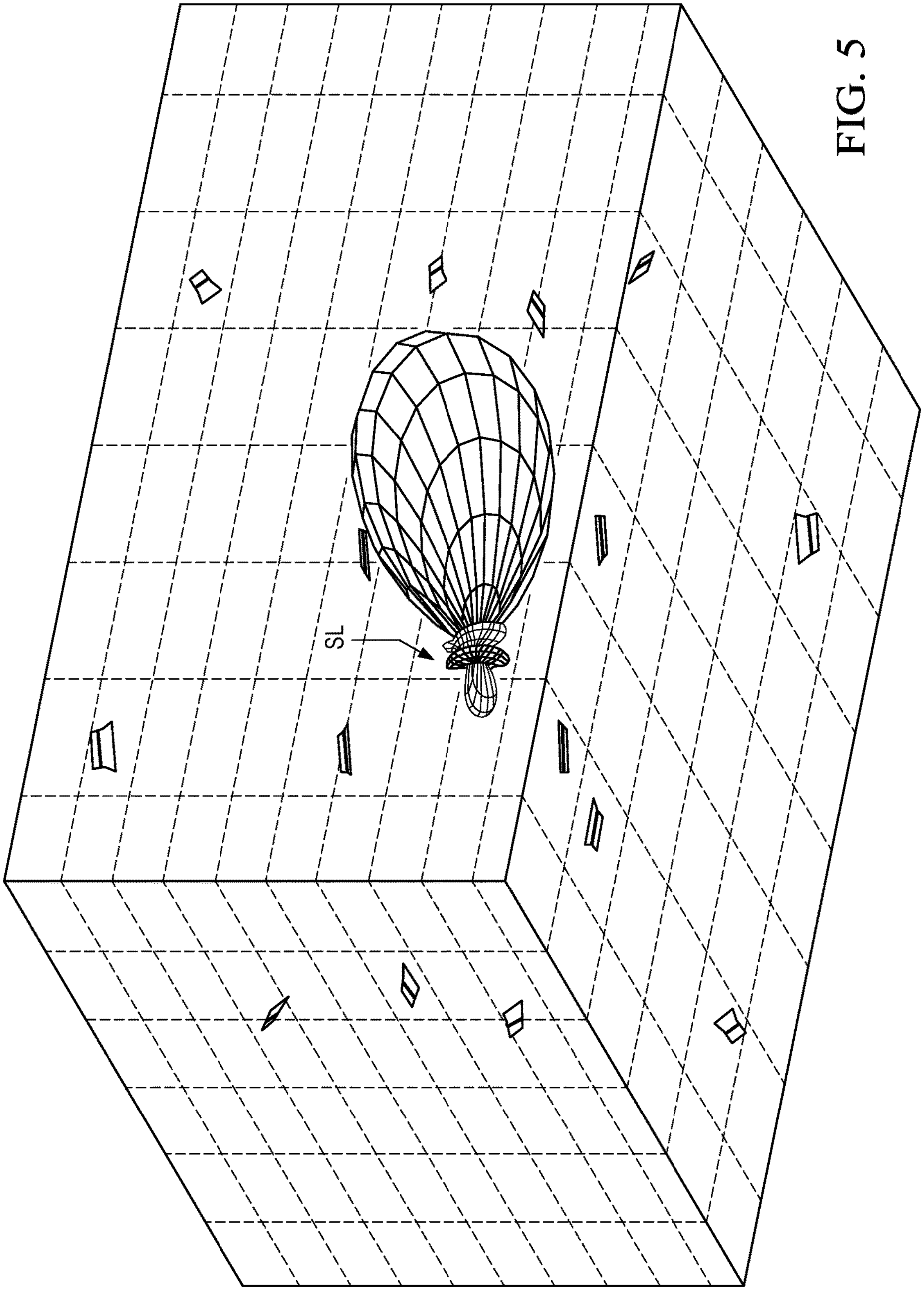
FIG. 5 illustrates a beam pattern resulting from decoding using a decoding matrix derived from VBAP.
Figure 6:
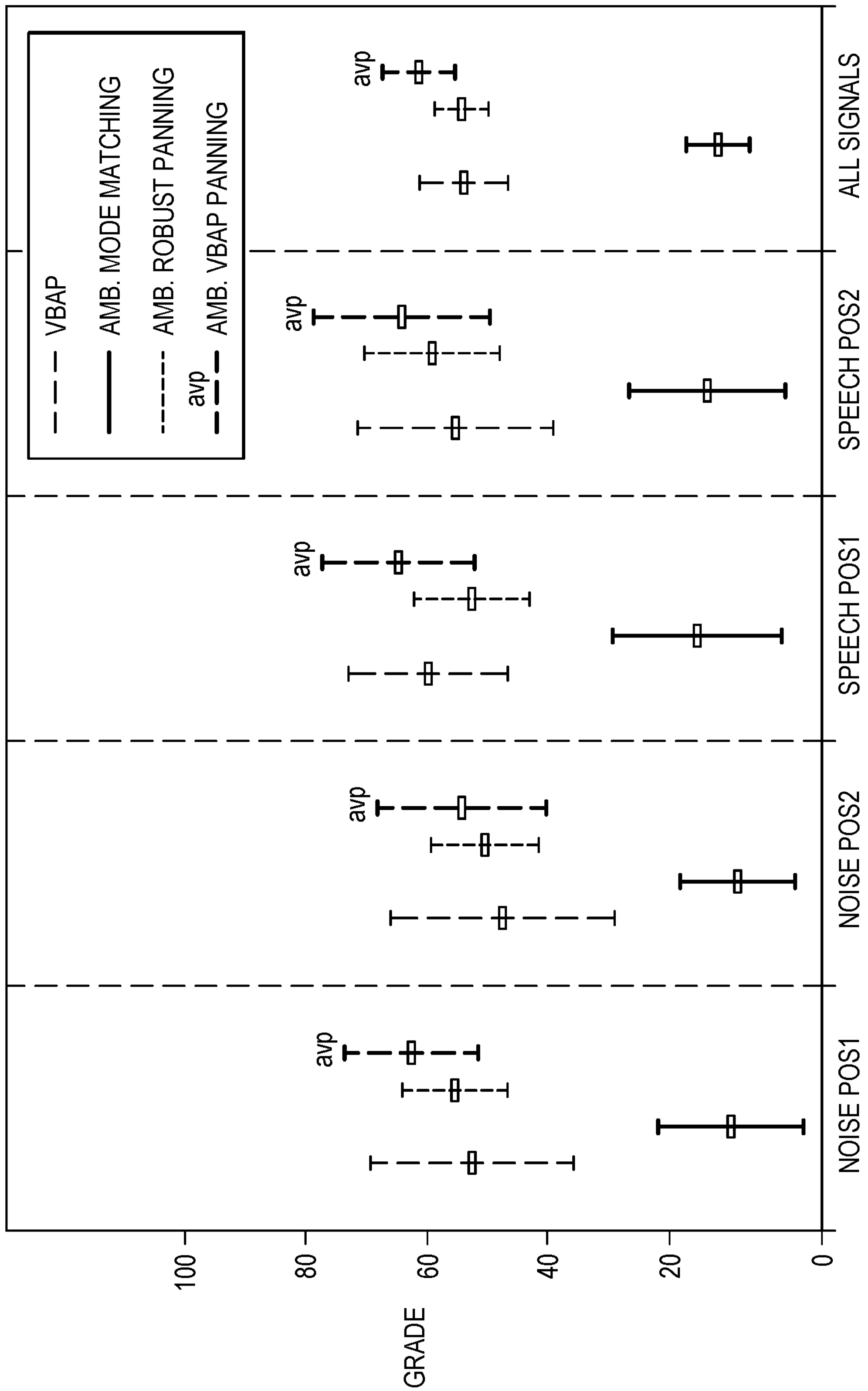
FIG. 6 illustrate results of a listening test.

The panning functions for W are taken as gain values g(Ω) calculated using eq.(4), where Ω is chosen according to eq.(13). The resulting decode matrix using eq.(15) is an Ambisonics decoding matrix facilitating the VBAP panning functions. An example is depicted in FIG. 5, which shows a beam pattern resulting from decoding using a decoding matrix derived from VBAP. Advantageously, the side lobes SL are significantly smaller than the side lobes $SL_{reg}$ of the regularised mode matching result of FIG. 4. Moreover, the VBAP derived beam pattern for the individual loudspeakers follow the geometry of the loudspeaker setup as the VBAP panning functions depend on the vector base of the addressed direction. As a consequence, the new approach according to the invention produces better results over all directions of the loudspeaker setup.

The source directions 103 can be rather freely defined. A condition for the number of source directions S is that it must be at least $(N+1)^2$. Thus, having a given order N of the soundfield signal $SF_c$ it is possible to define S according to $S \geq (N+1)^2$, and distribute the S source directions evenly over a unity sphere. As mentioned above, the result can be a spherical grid with an inclination angle θ running in constant steps of x (e.g. x=1 . . . 5 or x=10,20 etc.) degrees from 1 . . . 180° and an azimuth angle ϕ from 1 . . . 360° respectively, wherein each source direction Ω=(θ,ϕ) can be given by azimuth angle ϕ and inclination angle θ.

The advantageous effect has been confirmed in a listening test. For the evaluation of the localisation of a single source, a virtual source is compared against a real source as a reference. For the real source, a loudspeaker at the desired position is used. The playback methods used are VBAP, Ambisonics mode matching decoding, and the newly proposed Ambisonics decoding using VBAP panning functions according to the present invention. For the latter two methods, for each tested position and each tested input signal, an Ambisonics signal of third order is generated. This synthetic Ambisonics signal is then decoded using the corresponding decoding matrices. The test signals used are broadband pink noise and a male speech signal. The tested positions are placed in the frontal region with the directions $$\Omega 1 = (76.1°, -23.2°), \quad \Omega 2 = (63.3°, -4.3°) \tag{16}$$

The listening test was conducted in an acoustic room with a mean reverberation time of approximately 0.2 s. Nine people participated in the listening test. The test subjects were asked to grade the spatial playback performance of all playback methods compared to the reference. A single grade value had to be found to represent the localisation of the virtual source and timbre alterations. FIG. 5 shows the listening test results.

As the results show, the unregularised Ambisonics mode matching decoding is graded perceptually worse than the other methods under test. This result corresponds to FIG. 3. The Ambisonics mode matching method serves as anchor in this listening test. Another advantage is that the confidence intervals for the noise signal are greater for VBAP than for the other methods. The mean values show the highest values for the Ambisonics decoding using VBAP panning functions. Thus, although the spatial resolution is reduced—due to the Ambisonics order used—this method shows advantages over the parametric VBAP approach. Compared to VBAP, both Ambisonics decoding with robust and VBAP panning functions have the advantage that not only three loudspeakers are used to render the virtual source. In VBAP single loudspeakers may be dominant if the virtual source position is close to one of the physical positions of the loudspeakers. Most subjects reported less timbre alterations for the Ambisonics driven VBAP than for directly applied VBAP. The problem of timbre alterations for VBAP is already known from Pulkki. In opposite to VBAP, the newly proposed method uses more than three loudspeakers for playback of a virtual source, but surprisingly produces less coloration.

As a conclusion, a new way of obtaining an Ambisonics decoding matrix from the VBAP panning functions is disclosed. For different loudspeaker setups, this approach is advantageous as compared to matrices of the mode matching approach. Properties and consequences of these decoding matrices are discussed above. In summary, the newly proposed Ambisonics decoding with VBAP panning functions avoids typical problems of the well known mode matching approach. A listening test has shown that VBAP-derived Ambisonics decoding can produce a spatial playback quality better than the direct use of VBAP can produce. The proposed method requires only a sound field description while VBAP requires a parametric description of the virtual sources to be rendered.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated. It will be understood that modifications of detail can be made without departing from the scope of the invention. Each feature disclosed in the description and (where appropriate) the claims and drawings may be provided independently or in any appropriate combination. Features may, where appropriate be implemented in hardware, software, or a combination of the two.

Reference numerals appearing in the claims are by way of illustration only and shall have no limiting effect on the scope of the claims.

What is claimed is:

1. A method for decoding an ambisonics audio soundfield representation for playback, the ambisonics audio soundfield representation having an order N, the method comprising:

receiving, by a processor configured to decode the audio soundfield representation, the audio soundfield representation;

receiving, by the processor, a decode matrix for decoding the audio soundfield representation to determine a decoded audio signal, wherein the decode matrix is based on a mode matrix that was determined based on source directions and an order of the ambisonics audio soundfield representation;

wherein the decode matrix is further based on a second matrix containing panning functions for a first plurality of L loudspeaker positions and a second plurality of source directions, wherein a size of the second matrix is L×S, wherein the plurality of S source directions are distributed over a unit sphere, wherein each direction of the plurality of S source directions includes a corresponding azimuth angle and a corresponding inclination angle, and wherein S>=(N+1)^2, and wherein the panning functions are indicated by gain values; and determining the decoded audio signal based on a multiplication of the decode matrix and the audio soundfield representation.

2. The method of claim 1, wherein the decode matrix is predetermined.

3. A non-transitory computer readable medium having stored on it executable instructions to cause a computer to perform a method for decoding the ambisonics audio soundfield representation for audio playback according to claim 1.

4. A system for decoding an ambisonics audio soundfield representation for playback, the ambisonics audio soundfield representation having an order N, the system comprising:

a receiver for receiving the audio soundfield representation;

a processor for receiving a decode matrix for decoding the audio soundfield representation to determine a decoded audio signal, wherein the decode matrix is based on a mode matrix that was determined based on source directions and an order of the ambisonics audio soundfield representation;

wherein the decode matrix is further based on a second matrix containing panning functions for a first plurality of L loudspeaker positions and a second plurality of S source directions, wherein a size of the second matrix is L×S, wherein the plurality of S source directions are distributed over a unit sphere, wherein each direction of the plurality of S source directions includes a corresponding azimuth angle and a corresponding inclination angle, and wherein S>=(N+1)^2, and wherein the panning functions are indicated by gain values; and a decoder for determining the decoded audio signal based on a multiplication of the decode matrix and the audio soundfield representation.

* * * * *